United States Patent
Liu et al.

(10) Patent No.: US 10,331,109 B2
(45) Date of Patent: Jun. 25, 2019

(54) SYSTEM AND METHOD TO EMBED OBJECTS INTO STRUCTURE USING STEREOLITHOGRAPHY

(71) Applicant: Xerox Corporation, Norwalk, CT (US)

(72) Inventors: Chu-Heng Liu, Penfield, NY (US);
David A. Mantell, Rochester, NY (US);
Barry P. Mandel, Fairport, NY (US);
Mandakini Kanungo, Penfield, NY (US)

(73) Assignee: Xerox Corporation, Norwalk, CT (US)

( * ) Notice: Subject to any disclaimer, the term of this patent is extended or adjusted under 35 U.S.C. 154(b) by 740 days.

(21) Appl. No.: 14/945,828

(22) Filed: Nov. 19, 2015

(65) Prior Publication Data

US 2017/0144376 A1 May 25, 2017

(51) Int. Cl.
*G05B 19/4099* (2006.01)
*B29C 70/70* (2006.01)
*B29C 64/124* (2017.01)
*B33Y 50/02* (2015.01)
*B33Y 80/00* (2015.01)
*B33Y 10/00* (2015.01)

(52) U.S. Cl.
CPC ........ *G05B 19/4099* (2013.01); *B29C 64/124* (2017.08); *B29C 70/70* (2013.01); *B33Y 10/00* (2014.12); *B33Y 50/02* (2014.12); *B33Y 80/00* (2014.12); *G05B 2219/35134* (2013.01); *G05B 2219/49007* (2013.01)

(58) Field of Classification Search
CPC ... B29C 67/0088; B29C 64/124; B29C 70/70; G05B 19/4099; G05B 2219/35134; G05B 2219/49007; B33Y 10/00; B33Y 80/00; B33Y 50/02
See application file for complete search history.

(56) References Cited

U.S. PATENT DOCUMENTS

| | | | |
|---|---|---|---|
| 5,495,328 A | 2/1996 | Spence et al. | |
| 5,610,824 A | 3/1997 | Vinson et al. | |
| 6,027,682 A | 2/2000 | Almquist et al. | |
| 6,482,576 B1* | 11/2002 | Farnworth | B29C 41/48 264/401 |
| 6,544,465 B1 | 4/2003 | Farnworth et al. | |
| 2003/0203158 A1* | 10/2003 | Farnworth | B29C 41/20 428/137 |
| 2010/0047845 A1* | 2/2010 | Woodside | B01L 3/5085 435/29 |
| 2010/0121475 A1 | 5/2010 | Lyons | |
| 2013/0182998 A1* | 7/2013 | Andry | G02B 6/4204 385/33 |

(Continued)

*Primary Examiner* — Robert E Fennema
*Assistant Examiner* — Shon G Foley
(74) *Attorney, Agent, or Firm* — Maginot Moore & Beck LLP (57) ABSTRACT

A three-dimensional object printer uses stereolithography to form a structure and then embed one or more objects in the structure. The printer includes a controller that operates a source of ultraviolet (UV) radiation to cure a portion of a liquid photopolymer at an interface between the liquid photopolymer and the external surface of an embedded object with reference to a meniscus formed between the liquid photopolymer and the external surface of an embedded object. The incorporation of the embedded object speeds formation of the final object and increases the durability of the final object.

12 Claims, 6 Drawing Sheets

(56) References Cited

U.S. PATENT DOCUMENTS

| | | | |
|---|---|---|---|
| 2013/0313756 A1* | 11/2013 | Chen | B29C 41/52 264/401 |
| 2014/0291886 A1 | 10/2014 | Mark et al. | |
| 2014/0319737 A1 | 10/2014 | Ei-Siblani et al. | |
| 2017/0120387 A1* | 5/2017 | DeMuth | B33Y 10/00 |

\* cited by examiner

SYSTEM AND METHOD TO EMBED OBJECTS INTO STRUCTURE USING STEREOLITHOGRAPHY

TECHNICAL FIELD

This document relates to printers that produce three-dimensional objects and, more particularly, to printers that use stereolithography to produce such objects.

BACKGROUND

Digital three-dimensional manufacturing, also known as digital additive manufacturing, is a process of making a three-dimensional solid object of virtually any shape from a digital model. Some digital additive manufacturing systems use ejectors that eject drops of liquid photopolymer material in layers to form three-dimensional objects that are cured with an ultraviolet light from time to time. Other systems use stereolithography, which is an additive manufacturing technique that focuses an ultraviolet laser in a pool of liquid photopolymer to cure layers of a liquid photopolymer to produce a three-dimensional solid object. The stereolithography process involves generating digital image data of the object to be manufactured with a three-dimensional mathematical simulation or computer-aided drafting (CAD) program. The digital image data model is then sliced into extremely thin layers, usually on the order of 0.1 millimeter thick. The data for each image is used to position the pool of liquid photopolymer printer, focus the laser, and move the laser beam from the laser through the pool to build the object a layer at a time. A portion of the pool positioning is the lowering of the platform on which a tank of liquid photopolymer is located to submerge each formed layer with a thin covering of the liquid photopolymer, which is then exposed to the ultraviolet laser to cure another layer of the object. This process continues until all the layers of the object are cured and the stack of cured layers defines the three-dimensional object.

Current three-dimensional printers using stereolithography have significant limitations in terms of photopolymer materials used as well as the speed and precision at which the part can be manufactured. The limited selection of materials and limited precision can lead to manufactured objects having low strength and durability. Consequently, some parts cannot be made with sterolithography techniques so the parts are produced using traditional methods. Therefore, a stereolithography system that is capable of quickly producing durable objects would be advantageous.

SUMMARY

An improved method forms a three-dimensional object from a liquid photopolymer using stereolithography that increases the strength and durability of the manufactured object while also increasing the speed of the stereolithography process. The method includes operating with a controller at least one actuator to move a platform within a tank containing liquid photopolymer, operating with the controller the at least one actuator operatively connected to a source of ultraviolet (UV) radiation to move the source of UV radiation as the controller operates the source of UV radiation to emit UV radiation and cure a portion of the liquid photopolymer to form a layer of the three-dimensional structure, the controller operating the at least one actuator with reference to image data of the layer, operating with the controller the at least one actuator to lower the platform into the tank to submerge the formed layer within the liquid photopolymer at a predetermined depth, operating with the controller the at least one actuator to move the source of UV radiation as the controller operates the source of UV radiation to emit UV radiation and cure a portion of the liquid photopolymer to form a next layer of the three-dimensional object and leave an uncured portion of the next layer that corresponds to a portion of a cross-section of an object, the controller operating the at least one actuator with reference to image data of the next layer, operating with the controller the at least one actuator to place the object within the uncured portion of the next layer, the object having an exposed area extending out of the liquid photopolymer, operating with the controller the first actuator to lower the platform further into the tank of the liquid photopolymer to enable the liquid photopolymer to surround the object at an external surface of the object, identifying with the controller a meniscus formed at an interface between the liquid photopolymer surrounding the external surface of the object and the external surface of the object, and operating with the controller the at least one actuator to move the source of UV radiation as the controller operates the source of UV radiation with reference to the identified meniscus to cure a portion of the surrounding liquid photopolymer and bind the cured portion of the surrounding liquid photopolymer to the external surface of the object and the three-dimensional structure.

An improved stereolithography system forms three-dimensional objects from liquid photopolymer that possess increased durability, while also increasing the speed of the stereolithography process. The system includes a tank containing a volume of liquid photopolymer, a source of ultraviolet (UV) radiation configured to emit UV radiation to cure a portion of the liquid photopolymer exposed to the UV radiation, an object configured to be placed within an uncured portion of a next layer of the liquid photopolymer, the object having an exposed area extending out of the liquid photopolymer, a mechanical arm, at least one actuator operatively connected to a platform within the tank containing the liquid photopolymer, the source of UV radiation, and the mechanical arm, the at least one actuator being configured to move the platform within the tank containing the liquid photopolymer, to move the source of UV radiation, and to move the mechanical arm to place the object within the uncured portion of the next layer of the liquid photopolymer, and a controller operatively connected to the at least one actuator and the source of UV radiation. The controller is configured to: operate the at least one actuator to move the platform within the tank of the liquid photopolymer, operate the at least one actuator to move the source of UV radiation while the controller operates the source of UV radiation to cure a portion of the liquid photopolymer and form a layer of the three-dimensional structure, operate the at least one actuator to lower the platform into the tank to submerge the formed layer in the liquid photopolymer at a predetermined depth, operate the at least one actuator to move the source of UV radiation while operating the source of UV radiation with the controller to cure a portion of a next layer of liquid photopolymer and leave an uncured portion of the next layer that corresponds to a cross-section of an object, operate the at least one actuator to move the mechanical arm to place the object within the uncured portion of the next layer, operate the at least one actuator to lower the platform into the tank to enable liquid photopolymer to surround an external surface of the object, identify a meniscus formed at an interface between the external surface of the object and the liquid photopolymer surrounding the external surface of the object, and operate the at least one actuator to move the source of UV radiation while the controller operates the source of UV radiation to cure a portion of the liquid photopolymer surrounding the external surface of the object to bind the cured portion of the liquid photopolymer to the external surface of the object.

BRIEF DESCRIPTION OF THE DRAWINGS

The foregoing aspects and other features of a stereolithography system that forms three-dimensional objects by embedding a pre-fabricated object within the object being formed is explained in the following description, taken in connection with the accompanying drawings.

DETAILED DESCRIPTION

For a general understanding of the environment for the system and method disclosed herein as well as the details for the system and method, reference is made to the drawings. In the drawings, like reference numerals designate like elements.

Figure 1A:
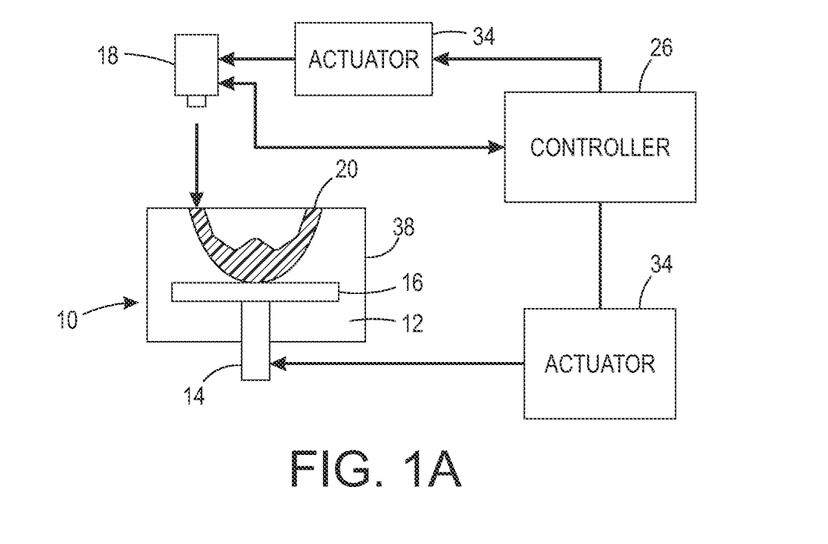
FIG. 1A illustrates a system that uses stereolithography for forming a three-dimensional structure to receive embedded objects.

A system for forming a three-dimensional structure with photopolymer material embedded with a pre-fabricated object to impart strength and durability is shown in FIG. 1A. The system 10 includes at least one actuator 34 that is operatively connected to a platform 14 and a source of ultraviolet radiation (UV) 18, a controller 26 operatively connected to the at least one actuator 34 and the source of UV radiation 18, and a tank 38. The platform 14 is positioned within the tank 38, which contains liquid photopolymer 12, and is configured to be moved vertically within the tank 38 by the at least one actuator 34. The controller 26 generates signals that operate the source of UV radiation to emit UV radiation. The controller 26 also generates signals that operate the at least one actuator 34 to move the platform 14 within the tank 38 and to move the source of UV radiation to expose a portion of the liquid photopolymer at or near the surface of the liquid photopolymer in the tank. Liquid photopolymer exposed to UV radiation cures to from a hard material. As shown in FIG. 1A, portions of the liquid photopolymer 12 have been exposed to form a three-dimensional structure 20 in the tank 38. As the controller 26 operates the at least one actuator to lower the platform 14, the structure 20 resting on horizontal surface 16 of platform 14 is submerged in the liquid photopolymer to enable a thin layer of liquid photopolymer to cover the structure. When this thin layer of liquid photopolymer is exposed to UV radiation by the source 18, the cured portion adheres to the previously formed portion of the structure 20. The at least one actuator 34 is one or more actuators that are operatively connected to components of the system 10 and are configured to move the components in response to signals from the controller 26. The actuators 34 can include stepper motors, motorized cams, worm gears, and the like to enable controlled movement of the components to which the actuators are connected.

Figure 1B:
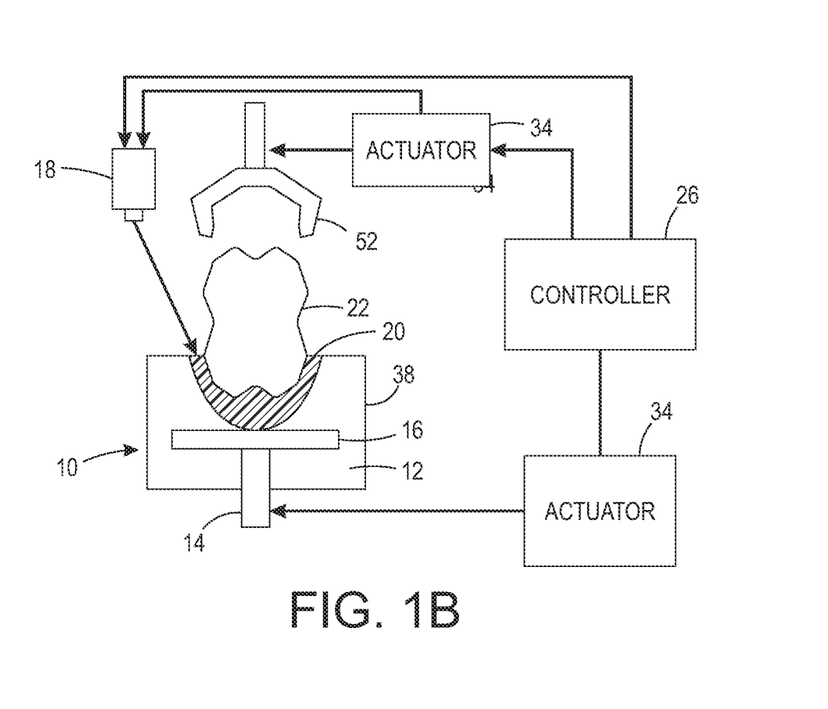
FIG. 1B illustrates the system of FIG. 1A placing the object to be embedded within the formed structure and binding the object to the structure.

As shown in FIG. 1B, the structure 20 has been formed with a U-shaped cross-section. This shape is formed by the controller 26, which uses image data of the structure from a CAD/CAM file or the like to operate the at least one actuator 34 to move the platform 34 and selectively expose portions of the liquid photopolymer to form the structure 20. When the structure reaches a predetermined shape and size, the controller 26 operates the at least one actuator 34 to move a mechanical arm to grip an object 22 that has been pre-fabricated to fit within the structure 20. As used in this document, a mechanical arm is a component configured for movement and for grasping and manipulating an article in response to an actuator driving the arm. The controller 26 also operates the at least one actuator 34 to move the object into engagement with the interior of the structure 20. During this movement of the object 22, the controller 26 can operate the at least one actuator 34 to rotate the object 22 to facilitate the alignment of the surface of the object 22 with the complementary structure of the interior of the structure 20. In some embodiments, the object 22 is made of a material that is more durable or has more strength than the cured photopolymer. The object 22 could be formed with other characteristics to enhance the final form of the structure 20. Pre-heating the object 22 before inserting the object into the structure 20 enhances the bonding between the object 22 and the structure 20. The heat softens the structure 20 to enable better contact between object 22 and structure 20. In addition, higher temperature may also partially cure the thin layer of photopolymer between the object and the structure to strengthen the bonds between them. Once the object 22 is in place, the controller 26 operates the at least one actuator 34 to lower the structure 20 and the object 22 so a thin layer of liquid photopolymer is presented at the interface of the structure 20 and the object 22. The controller 26 can then operate the at least one actuator 34 to move the source of UV radiation over the tank 38 while operating the source 18 to expose the liquid photopolymer at this interface to UV radiation. The cured photopolymer binds the object 22 to the structure 20. Once the object 22 is bound to the structure 20, the controller continues to operate the at least one actuator 34 and the source of UV radiation 18 to bind additional layers of cured photopolymer material to the object 22 to complete the structure 20.

Figure 2:
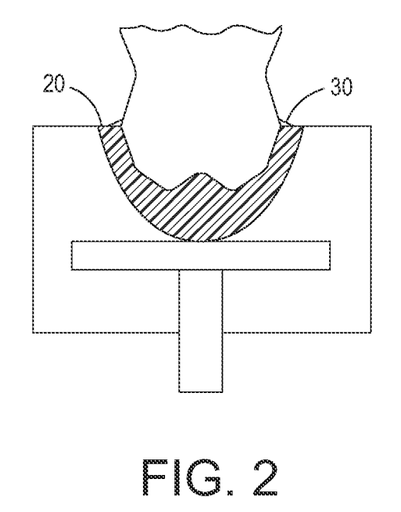
FIG. 2 is an enlarged view of the interface between the object to be embedded and the structure shown in FIG. 1 showing a meniscus in the liquid photopolymer at the interface.

One issue that arises during the completion of the structure 20 is the meniscus formed by the liquid photopolymer at the interface between the structure 20 and the object 22. Such a meniscus 30 is shown in FIG. 2. The curve in the meniscus 30 close to the surface of the object is higher or lower depending on the contact angle, the orientation of the surface of the object 22, the distance between the UV source 18 and the object 22, and local geometry of the object surface. The issues regarding the curing of the liquid photopolymer at the meniscus can be addressed by identifying a shape of the meniscus if the geometry and contact angles are known. This information can be used by the controller 26 to adjust the image data used to move and operate the UV source 18.

Figure 3:
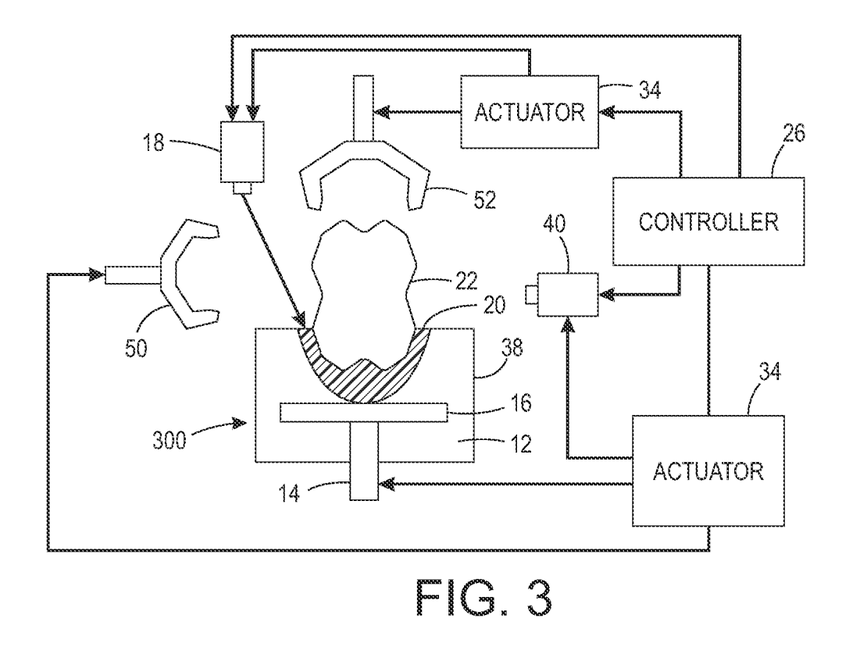
FIG. 3 illustrates the system of FIG. 1A and FIG. 1B with additional components to aid in the positioning of the object to be embedded in the structure.

Another approach for addressing the meniscus issue is the incorporation of an optical sensor 40 that generates image data of the meniscus at the interface of the structure 20 and the object 22. Such a system 300 is shown in FIG. 3. Using like numbers for like components, the system 300 is shown with many of the components described above for the system 10. In addition to those components, system 300 includes a second mechanical arm 50 and an optical sensor 40. The image data generated by the optical sensor 40 are processed by the controller 26 to measure the meniscus 30. This information can be used by the controller 26 to adjust the image data used to move and operate the UV source 18. The controller 26 operates the at least one actuator 34 to move the second mechanical arm 50 to turn or otherwise adjust the position of object 22 within the structure 20 if the mechanical arm 52 is unable to do so.

Yet another way of addressing the issues arising from the meniscus 30 is to treat the object 22 or design its surface configuration in a way that enables a contact angle of about 90 degrees to be formed at the interface of the object 22 and the liquid 12. One way of optimizing the design of the surface of the object 22 is to form the surface of object 22 with small curvatures. Small curvatures help attenuate the meniscus at the interface of object 22 and the liquid 12. Other surface treatments that help attenuate the meniscus 30 include roughening the surface and treating the object surface with chemicals or a plasma/corona discharge that alters the surface energy of the object 22. Chemical treatments include applying a primer coating using a sprayer or roller applicator.

Another issue that arises during the completion of the structure 20 is a shadow produced by the portion of the object 22 that extends above the interface of the liquid photopolymer and the object 22. This shadow can adversely impact the curing of the photopolymer within the shadow. To address this issue, the controller can operate the actuator 34 to move the UV source 18 to various positions to eliminate shadows since a line of sight can be established for a formerly shadow region after a proper repositioning of the UV source. Alternatively, multiple UV sources 18 can be positioned about the structure 20 and object 22 to illuminate and cure the photopolymer from various angles to avoid the shadow produced by the portion of the object 22 extending above the photopolymer surface. Alternatively or additionally, the controller 18 can operate the actuator 34 to rotate the platform 14 to move the shadow to other areas already cured so the uncured photopolymer formerly within the shadow can be cured by operation of the UV source 18.

Figure 4:
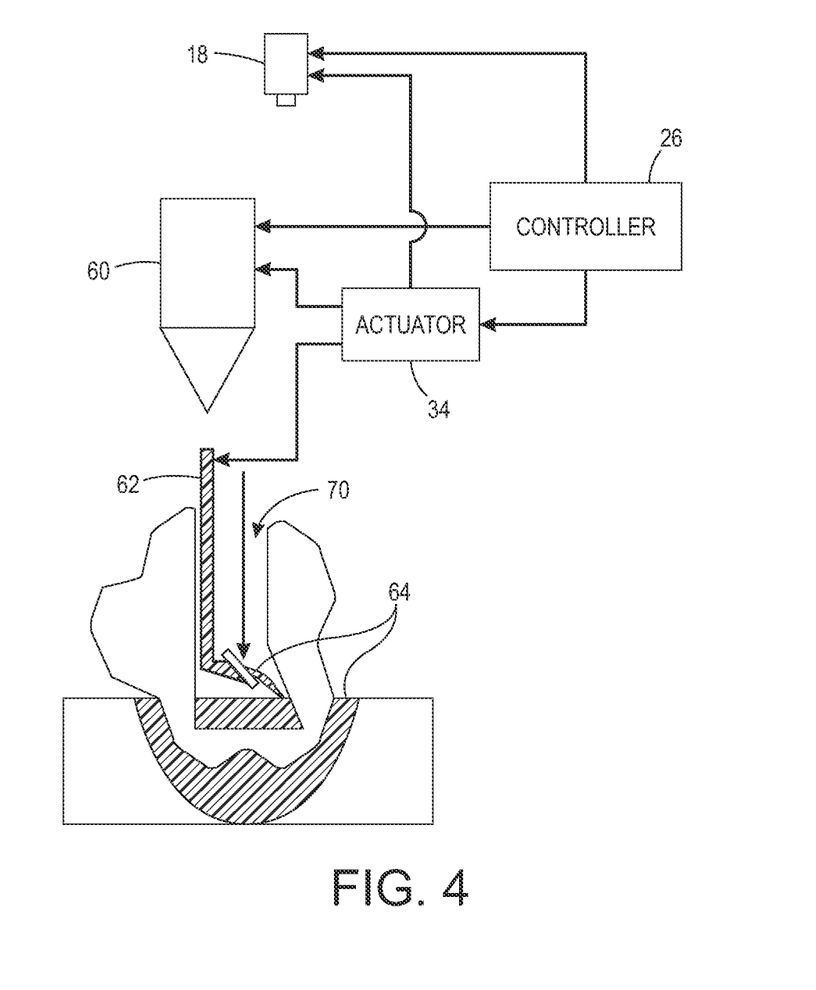
FIG. 4 illustrates components of the system shown in FIG. 1A and FIG. 1B with additional components for forming structure within an opening of the object.

Some objects 22 may be formed with an opening 70 as shown in FIG. 4. Using like numbers for like components discussed above with regard to FIG. 1A, a system 400 is shown in FIG. 4. In this system, controller 26 is operatively connected to a UV source 18, an injector 60, and a member 62 that terminates in a mirror 64. The controller operates the at least one actuator 34 to move the injector 60 to release liquid photopolymer into the opening 70. The controller 26 can then operate the at least one actuator 34 to move member 62 to insert the mirror 64 within the cavity communicating with the opening 70. Controller 26 can operate the at least one actuator 34 to move the UV source 18 to a position to enable the UV radiation emitted by the source 18 to propagate towards and strike the mirror 64. The mirror 64 reflects the UV radiation to enable the liquid photopolymer in the cavity to be exposed to the UV radiation and be cured. Alternatively, in place of the mirror 64, fiber optics can be used to deliver the UV light to the desired location within the inside of the object 22. Thus, the objects 22 that can be embedded in the structure 20 can be configured for a number of different purposes and applications.

Figure 5:
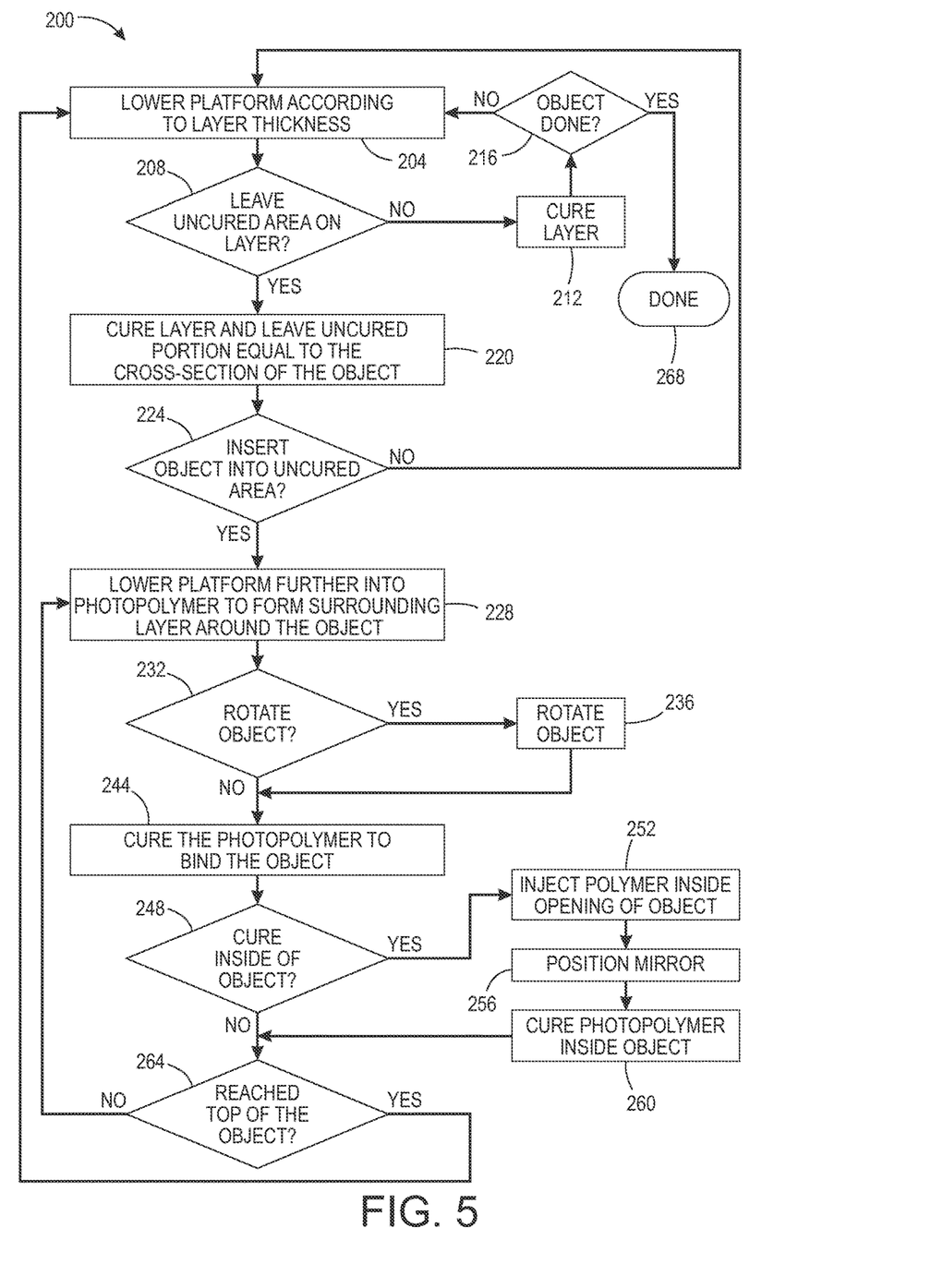
FIG. 5 is a flow diagram of a process for forming a three-dimensional structure having an embedded object using stereolithography.

A method 200 for embedding an object in a three-dimensional structure is shown in FIG. 5. In the description of this method, statements that a process is performing some task or function refers to a controller or general purpose processor executing programmed instructions stored in a memory operatively connected to the controller or processor to manipulate data or to operate one or more components in the printer to perform the task or function. The controller 26 noted above can be such a controller or processor. Alternatively, the controller 26 can be implemented with more than one processor and associated circuitry and components, each of which is configured to form one or more tasks or functions described herein.

The process 200 begins with lowering a platform within a tank of liquid photopolymer to a predetermined level for the formation of a cured photopolymer layer (block 204). The process determines if a portion of the liquid photopolymer is to be left uncured (block 208) and, if not, the layer is cured (block 212). The cured layer is the last layer for the structure (block 216), then the process is finished (block 268). Otherwise, the process continues by lowering the platform to position liquid photopolymer above the cured layer for the formation of a next layer.

If a portion of a layer is to be left uncured (block 208), then the layer being formed is selectively exposed to the UV radiation to form cured and uncured areas that conform to the cross-sectional shape of an object to be embedded (block 220). The process determines whether the structure has been sufficiently finished for insertion of the object (block 224), and if it is not, then formation of the structure for receiving the object continues (blocks 204 to 224). Once the structure is ready to receive the object, the object is inserted in the structure and the platform is lowered to enable a layer of liquid photopolymer to cover the interface between the object and the structure (block 228). The process determines whether the object requires rotation to fit appropriately (block 232), and operates one or more mechanical arms to rotate or otherwise position the object within the structure (block 236). The process then cures the photopolymer at the interface of the object and the structure (block 244) to bind the object to the structure. If the object has an opening (block 248), the injector is operated to release liquid photopolymer in the opening (block 252), the member is moved to position the mirror within the cavity communicating with the opening (block 256), and the UV source is operated to reflect UV radiation off the mirror to expose the liquid photopolymer and cure it (block 260). If the object has no opening, then the process determines whether the structure formation about the object has been completed (block 264), and if it has, the process determines whether additional structure is be formed (blocks 204 to 216). If no other structure is to be formed, then the structure is completed (block 268). Otherwise, the process continues with the formation of the structure about the object (blocks 204 to 216).

Figure 6A:
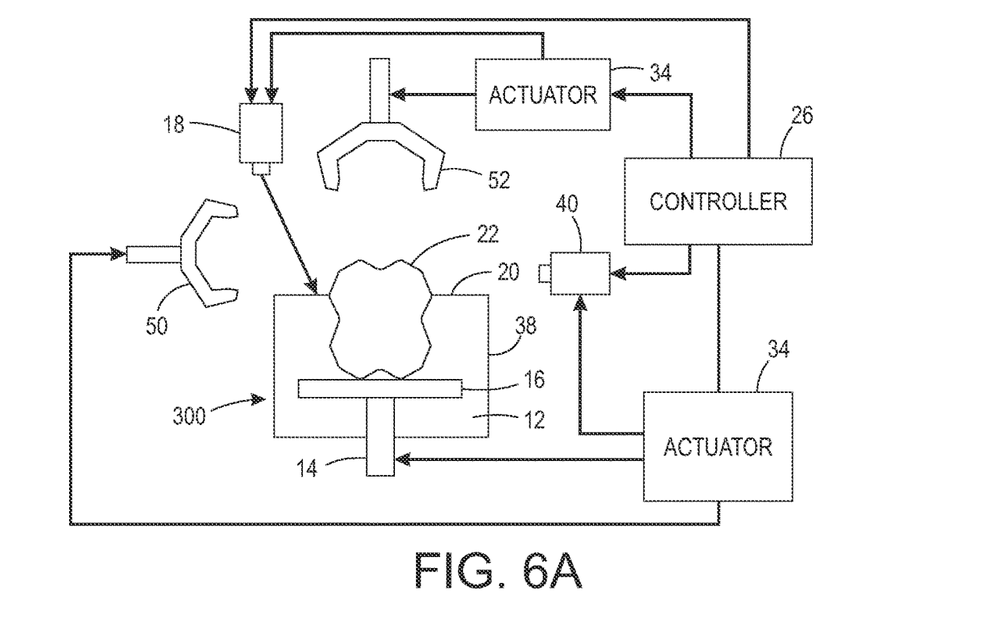
FIG. 6A to 6D illustrate the use of the system of FIG. 3 to form structure on an object and then reorient the object before finishing the structure about the object.
Figure 6B:
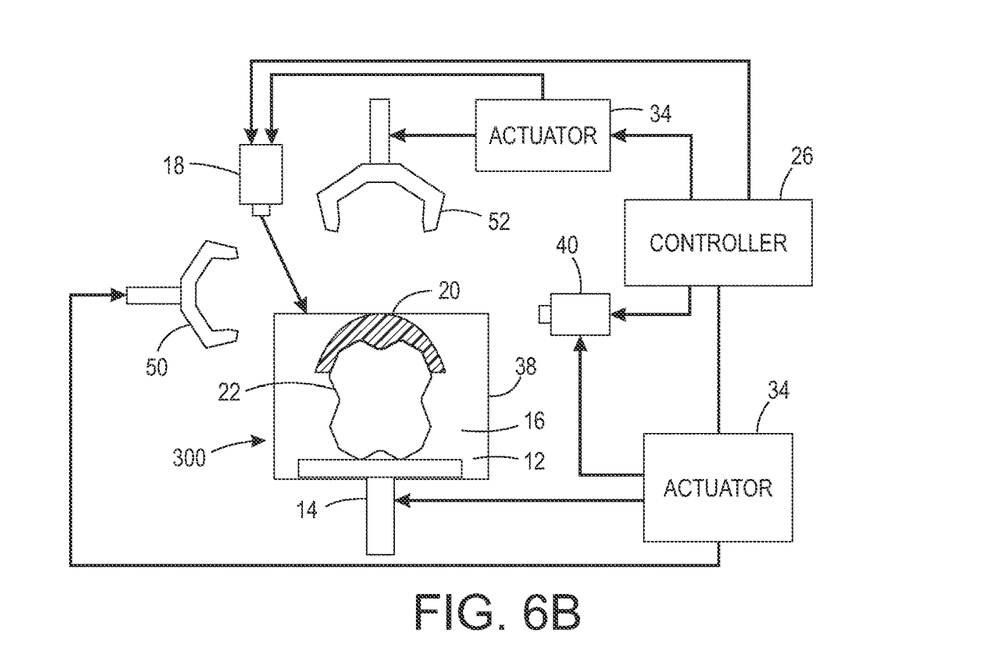
Figure 6C:
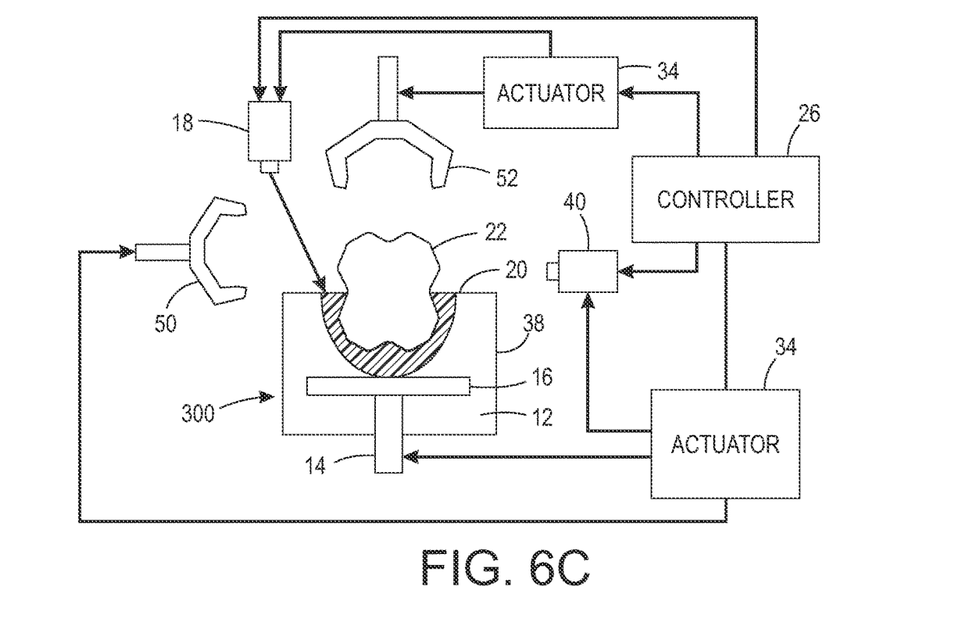
Figure 6D:
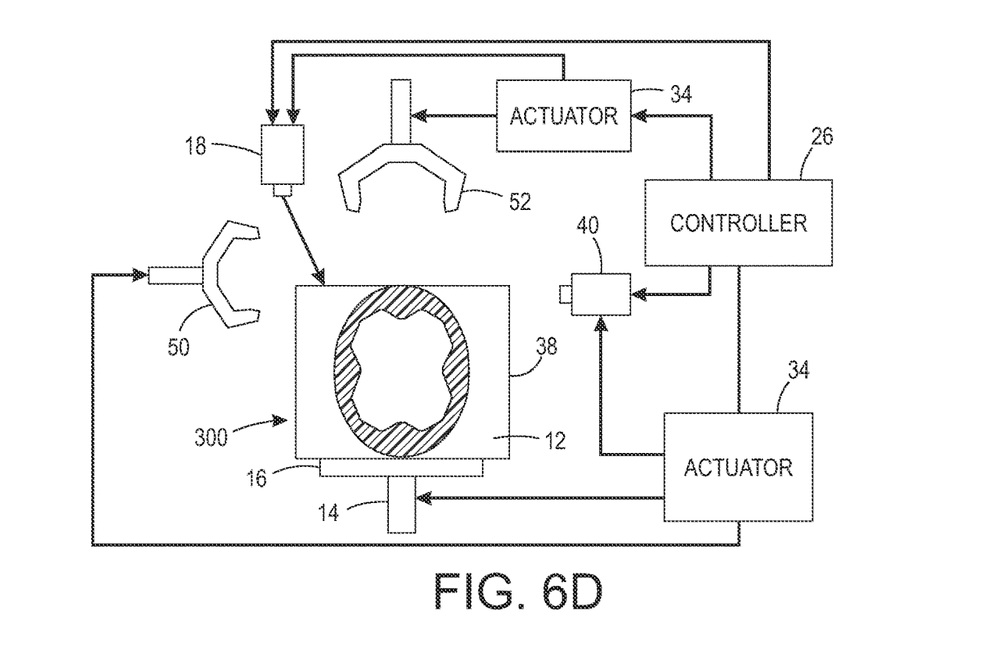

The system of FIG. 3 can also be used to form parts with embedded pre-fabricated objects in a manner depicted in FIG. 6A through 6D. As shown in FIG. 6A, the pre-fabricated object 22 can be positioned on the platform 14 and the controller 26 operates the actuator 34 to lower the object into the photopolymer within the tank 38. The controller 26 can iteratively operate the UV source 18 to cure the photopolymer adjacent the object 22 and operate the actuator 34 to lower the platform 14 until a structure 20 is formed on the upper end of the object 22. This process results in the object 22 having a cap as shown in FIG. 6B. The controller 26 then operates the actuator 34 to lift the object 22 and structure 20 out of the tank 38 so one or both mechanical arms 50 and 52 can be operated by the controller to reorient the object 22 and structure 20 and place it on the platform 14 as shown in FIG. 6C. In the example shown, the object reorientation is an inversion of the object, but other reorientations could be performed as well. The controller 26 operates the UV source 18 and actuator 34 to extend the previously formed structure 20. The operation of the actuator to lower the platform and move the source of UV radiation can be performed iteratively until the object 22 is encapsulated within structure 20 as shown in FIG. 6D. Of course, the controller 26 can also operate the UV source 18 and actuator 34 to form structure about the object 22 in a selective manner. Once the last of the structure 20 has been formed about the object 22, the mechanical arms 50, 52 can be operated to lift the object 22 and structure 20 from the platform 14.

It will be appreciated that variants of the above-disclosed and other features and functions, or alternatives thereof, may be desirably combined into many other different systems, applications or methods. Various presently unforeseen or unanticipated alternatives, modifications, variations or improvements may be subsequently made by those skilled in the art that are also intended to be encompassed by the following claims.

What is claimed:

1. An additive manufacturing method of forming a three-dimensional structure from a liquid photopolymer using stereolithography comprising:
    operating with a controller at least one actuator to move a platform within a tank containing liquid photopolymer;
    operating with the controller the at least one actuator operatively connected to a source of ultraviolet (UV) radiation to move the source of UV radiation as the controller operates the source of UV radiation to emit UV radiation and cure a portion of the liquid photopolymer to form a layer of the three-dimensional structure, the controller operating the at least one actuator with reference to image data of the layer;
    operating with the controller the at least one actuator to lower the platform into the tank to submerge the formed layer within the liquid photopolymer at a predetermined depth;
    operating with the controller the at least one actuator to move the source of UV radiation as the controller operates the source of UV radiation to emit UV radiation and cure a portion of the liquid photopolymer to form a next layer of the three-dimensional structure and leave an uncured portion of the next layer that corresponds to a portion of a cross-section of an object, the controller operating the at least one actuator with reference to image data of the next layer;
    operating with the controller the at least one actuator to place the object within the uncured portion of the next layer, the object having an exposed area extending out of the liquid photopolymer;
    operating with the controller the first actuator to lower the platform further into the tank of the liquid photopolymer to enable the liquid photopolymer to surround the object at an external surface of the object;
    generating with an optical sensor image data of the meniscus and the surrounding liquid photopolymer;
    identifying with the controller measurements of a meniscus formed at an interface between the liquid photopolymer surrounding the external surface of the object and the external surface of the object, the controller analyzing the generated image data to identify the measurements of the meniscus;
    modifying the image data for another layer with reference to the identified measurements of the meniscus; and
    operating with the controller the at least one actuator using the modified image data to move the source of UV radiation as the controller operates the source of UV radiation to cure a portion of the surrounding liquid photopolymer and bind the cured portion of the surrounding liquid photopolymer to the external surface of the object and the three-dimensional structure.

2. The method of claim 1 further comprising:
    operating with the controller the at least one actuator to rotate the object before identifying the measurements of the meniscus.

3. The method of claim 1 further comprising:
    reducing the meniscus by operating the at least one actuator with the controller to position the object to form a contact angle within a predetermined limit of ninety degrees between the liquid photopolymer and the external surface of the object.

4. The method of claim 1 further comprising:
    operating with the controller an injector to release liquid photopolymer within an opening in the object; and
    operating with the controller the at least one actuator to position a mirror within the opening in the object and to position the source of UV radiation while operating the source of UV radiation to direct UV radiation towards the mirror to enable a portion of the liquid photopolymer within the opening to be cured.

5. The method of claim 1 further comprising:
    operating with the controller a plurality of sources of UV radiation to enable photopolymer within a shadow formed by the portion of the object extending above a top surface of the photopolymer to be cured.

6. The method of claim 1 further comprising:
    operating with the controller the at least one actuator to rotate the platform to enable a portion of the photopolymer within a shadow formed by the portion of the object extending above a top surface of the photopolymer to move out of the shadow and be cured by the source of UV radiation.

7. A system for forming a three-dimensional structure from a liquid photopolymer using stereolithography comprising:
    a tank containing a volume of liquid photopolymer;
    a platform configured for movement within the tank;
    a source of ultraviolet (UV) radiation configured to emit UV radiation to cure a portion of the liquid photopolymer exposed to the UV radiation;
    a mechanical arm;
    at least one actuator operatively connected to the platform within the tank containing the liquid photopolymer, the source of UV radiation, and the mechanical arm, the at least one actuator being configured to move the platform within the tank containing the liquid photopolymer, to move the source of UV radiation to expose portions of the liquid photopolymer to the UV radiation emitted by the UV radiation source, and to move the mechanical arm;
    an optical sensor configured to generate image data of the meniscus and the surrounding liquid photopolymer; and a controller operatively connected to the at least one actuator, the optical sensor, and the source of UV radiation, the controller being configured to:
  operate the at least one actuator to move the platform within the tank of the liquid photopolymer;
  operate the at least one actuator using image data of a layer to move the source of UV radiation while the controller operates the source of UV radiation to cure a portion of the liquid photopolymer and form a layer of the three-dimensional structure;
  operate the at least one actuator to lower the platform into the tank to submerge the formed layer in the liquid photopolymer at a predetermined depth;
  operate the at least one actuator using image data of a next layer to move the source of UV radiation while operating the source of UV radiation with the controller to cure a portion of a next layer of liquid photopolymer and leave an uncured portion of the next layer that corresponds to a cross-section of an object;
  operate the at least one actuator to move a mechanical arm to place the object within the uncured portion of the next layer;
  operate the at least one actuator to lower the platform into the tank to enable liquid photopolymer to surround an external surface of the object;
  identify measurements of a meniscus formed at an interface between the external surface of the object and the liquid photopolymer surrounding the external surface of the object by analyzing the generated image data of the meniscus received from the optical sensor;
  modify the image data for another layer using the identified measurements of the meniscus; and
  operate the at least one actuator using the modified image data of the other layer to move the source of UV radiation while the controller operates the source of UV radiation to cure a portion of the liquid photopolymer surrounding the external surface of the object to bind the cured portion of the liquid photopolymer to the external surface of the object.

8. The system of claim 7, the controller being further configured to:
  operate the at least one actuator to move the mechanical arm to rotate the object before identifying the meniscus.

9. The system of claim 7, the controller being further configured to:
  reduce the meniscus by operating the at least one actuator with the controller to position the object to form a contact angle within a predetermined limit of ninety degrees between the liquid photopolymer and the external surface of the object.

10. The system of claim 7 further comprising:
  an injector configured to release liquid photopolymer;
  the at least one actuator being operatively connected to a mirror, the at least one actuator being configured to position a mirror within the opening in the object; and
  the controller is operatively connected to the injector, the controller being further configured to operate the injector to release liquid photopolymer in an opening in the object and to operate the at least one actuator to position the source of UV radiation while operating the source of UV radiation to direct UV radiation towards the mirror to enable a portion of the liquid photopolymer within the opening in the object to be cured.

11. The system of claim 7 further comprising:
  a plurality of sources of UV radiation positioned at different locations about the platform; and
  the controller being further configured to operate the sources of UV radiation with the plurality of sources of UV radiation to enable photopolymer within a shadow formed by the portion of the object extending above a top surface of the photopolymer to be cured.

12. The system of claim 7, the controller being further configured to operate the at least one actuator to rotate the platform to enable a portion of the photopolymer within a shadow formed by the portion of the object extending above a top surface of the photopolymer to move out of the shadow and be cured by the source of UV radiation.

* * * * *